(12) United States Patent
Gudmundson et al.

(10) Patent No.: US 7,423,697 B1
(45) Date of Patent: Sep. 9, 2008

(54) METHOD AND APPARATUS FOR AC COUPLING A SIGNAL WHILE RESTORING DC LEVELS

(75) Inventors: Daniel Gudmundson, Austin, TX (US); Ahsan Habib Chowdury, Austin, TX (US); James A. Antone, Austin, TX (US); Rahul Singh, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 572 days.

(21) Appl. No.: 11/015,728

(22) Filed: Dec. 16, 2004

(51) Int. Cl.
*H04N 7/18* (2006.01)

(52) U.S. Cl. .................................................. 348/691

(58) Field of Classification Search ................ 348/691, 348/689, 692, 695, 693–694
See application file for complete search history.

(56) References Cited

U.S. PATENT DOCUMENTS

| | | | | |
|---|---|---|---|---|
| 4,135,200 A | * | 1/1979 | Shanley, II | 348/689 |
| 4,598,316 A | * | 7/1986 | Rogers, III | 348/689 |
| 4,977,460 A | * | 12/1990 | Hirose | 386/47 |
| 5,057,922 A | * | 10/1991 | Kanai | 348/695 |
| 5,117,123 A | * | 5/1992 | Sendelweck | 327/378 |
| 5,825,826 A | * | 10/1998 | May et al. | 375/295 |
| 5,969,762 A | * | 10/1999 | George | 348/379 |
| 5,986,719 A | * | 11/1999 | Nakamura | 348/682 |
| 6,175,279 B1 | * | 1/2001 | Ciccarelli et al. | 330/296 |

* cited by examiner

*Primary Examiner*—Paulos M Natnael
(74) *Attorney, Agent, or Firm*—Wong, Cabello, Lutsch, Rutherford, & Brucculeri, LLP (57) ABSTRACT

A system in which drooping of the video levels due to leakage currents and proper DC bias level is addressed by providing a charge into the video signal to offset the leakage currents and to provide DC bias. To determine the leakage current level, measurements are made measuring the voltages of the syncs and the blanking intervals. To determine the DC bias, a measurement is made of the sync. Over a series of video lines these measurements are averaged. If the average is below the desired level, a charge is provided via a current source to the incoming signal. By having the current source provide charge during each video line, droop is reduced and the proper DC bias is provided.

19 Claims, 6 Drawing Sheets

METHOD AND APPARATUS FOR AC COUPLING A SIGNAL WHILE RESTORING DC LEVELS

CROSS-REFERENCE TO RELATED APPLICATIONS

This case is related to U.S. patent application Ser. No. 11/015,756 entitled, "Title: Method and Apparatus to Interface Video Signals to a Decoder to Compensate for Droop," by Daniel Gudmundson, Shyam Somayajula, Ahsan Chowdhury, James Antone and Rahul Singh, filed concurrently herewith, which is hereby incorporated by reference.

BACKGROUND OF THE INVENTION

1. Field of the Inventions

The inventions generally relates to video decoders, and more specifically to input video signal shaping, and even more specifically to providing constant video signal levels.

2. Description of Related Art

There is a large surge in the use of digital video devices today. Examples include: digital televisions, LCD (Liquid Crystal Display) TVs and monitors, DVD (Digital Versatile Disc) recorders, personal video recorders, PC (Personal Computers) video cards, video capture and streaming applications, and video conferencing. In many cases, these units need to receive an analog video signal, which may be one of the composite signals, such as NTSC (National Television Standards Committee), PAL (Phase Alternating Line) or SECAM (Sequential Couleur Avec Mémoire); s-video; component video or RGB (Red, Green, Blue). It is then desirable to produce the proper digital output, such as eight or ten bit ITU-R BT 656. It is preferred that all the video decoding be done in a single chip for all of these formats. The decoder not only has to handle composite signals, which means it must be able to determine the chroma and luma values, but it also must handle vertical blanking interval (VBI) data and handle VCR signals, which may be unstable signals.

In many cases, the actual signal level being received will droop over time due to various leakage currents. This droop will result in the signal effectively getting darker, i.e., having less amplitude or less luminance. It is very desirable, of course, that the picture remain at a constant brightness level as compared to the transmission level, and therefore, it would be desirable if some way to address the drooping was developed.

Because the composite video signal is usually AC coupled into the decoder, a DC bias level of the internal signal must be developed. If this DC bias level is not correct, all brightness values will be incorrect. It is very desirable, of course, that the picture remain at the proper brightness level as compared to the transmission level, and therefore, it would be desirable to provide the proper DC bias level.

SUMMARY OF THE INVENTION

Drooping of the video levels due to leakage currents is addressed by providing a charge into the video signal to offset the leakage currents. To determine the actual leakage current level, a series of measurements are made measuring the voltages of the syncs and the blanking intervals. These measurements are made over a series of video lines and then averaged. If the average is below the desired level, a charge is provided via a current source to the incoming signal. When the measurement is again performed, if there is an offset from the desired level, the setting on the current source is changed so that effectively the amount of charge being provided by the current source settles into the desired level. By having the current source provide charge during each video line, droop is dramatically reduced. This droop reduction results in more uniform brightness levels in the output video signals.

A proper DC bias level for the composite video signal is developed by monitoring the sync tip voltage. The actual voltage of the sync tip is measured a number of times to develop an average value. This average value is compared to the desired level. To make any necessary adjustments, a charge is provided to the incoming signal by a current source. When the measurement is again performed, if there is an offset from the desired level, the setting on the current source is changed so that effectively the amount of charge being provided by the current source settles into the desired level. By having the current source provide charge during each video line, the proper DC bias level is developed. This proper DC bias level results in proper brightness levels in the output video signals.

DETAILED DESCRIPTION OF THE PREFERRED EMBODIMENT

Figure 1:
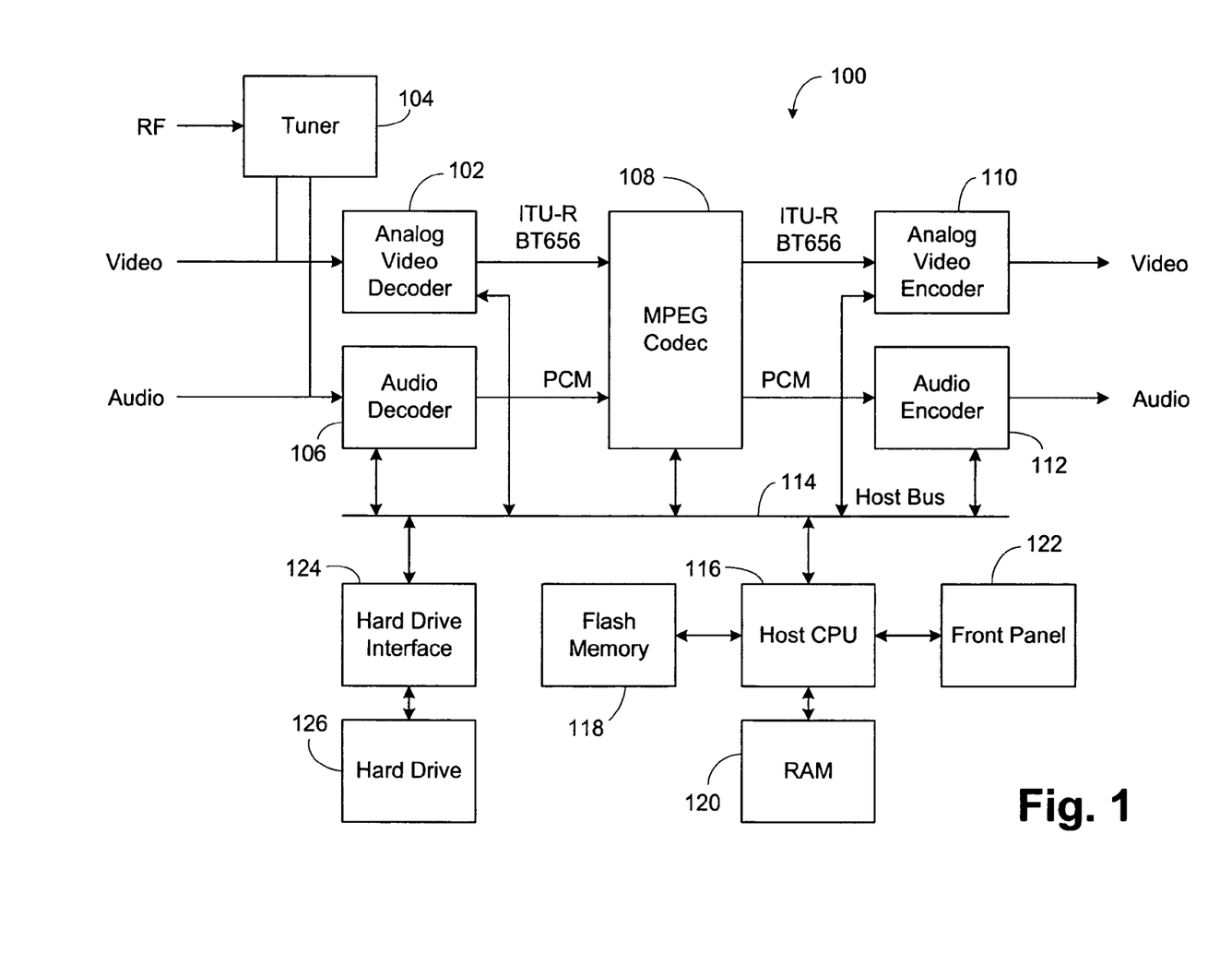
FIG. 1 displays a block diagram of an exemplary personal video recorder using an analog video decoder according to the present invention.

Referring now to FIG. 1, an exemplary personal video recorder (PVR) 100 is shown. PVR 100 is an exemplary use of analog video decoder 102, and it is understood that the analog video decoder 102 can be used in multiple applications including digital televisions, LCD TVs, DVD recorders, video capture situations, and the like. A radio frequency or broadcast signal is provided to a tuner 104. The tuner 104 provides both video and audio outputs. The video output from the tuner 104 or a video signal from an external connection is provided to analog video decoder 102. The audio signal from the tuner 104 or an external audio signal is provided to an audio decoder 106. The output of the analog video decoder 102 is preferably an ITU-R (International Telecommunication Union-Radio-Communication) BT (Broadcasting Service-television) 656 format digital signal, which is either an eight or ten bit signal. This output of the video decoder 102 is provided to an MPEG (Moving Pictures Expert Group) codec 108 to perform video compression in the digital domain. Similarly, the audio decoder 106 provides a PCM (Pulse Code Modulation) signal to the MPEG codec 108 to allow it to perform compression of the audio signal. The MPEG codec 108 in output mode provides an ITU-R BT 656 digital stream to an analog video encoder 110, which in turns produces an analog video signal output. Similarly, the MPEG codec 108 provides a PCM digital signal stream to an audio encoder 112, which provides an analog audio signal output.

The MPEG codec 108 is connected to a host bus 114 of a host CPU (Central Processing Unit) 116. The host CPU 116 performs processing operations and controls the various devices located in the PVR 100. The host CPU 116 is connected to flash memory 118 to hold its program and RAM (Random Access Memory) 120 for data storage. The host CPU 116 also interfaces with a front panel 122. A hard drive interface 124 is also connected to the host bus 114, with a hard drive 126 connected to the hard drive interface 124. The various decoders 102 and 106 and encoders 110 and 112 are also connected to the host bus 114 to allow control and setup by the host CPU 116.

In operation, video and audio signals are provided, respectively. To the analog video decoder 102 and the audio decoder 106, which then provide their digital streams to the MPEG codec 108. The host CPU 116 programs the MPEG codec 108 to transfer data to the hard drive interface 124, and thus to the hard drive 126, for storage. The host CPU 116 could at a later time direct data to be transferred from the hard drive 126 to the MPEG codec 108 for playback.

Thus, it can be seen that an analog video decoder 102 is an important part of such analog-to-digital video devices.

Figure 2:
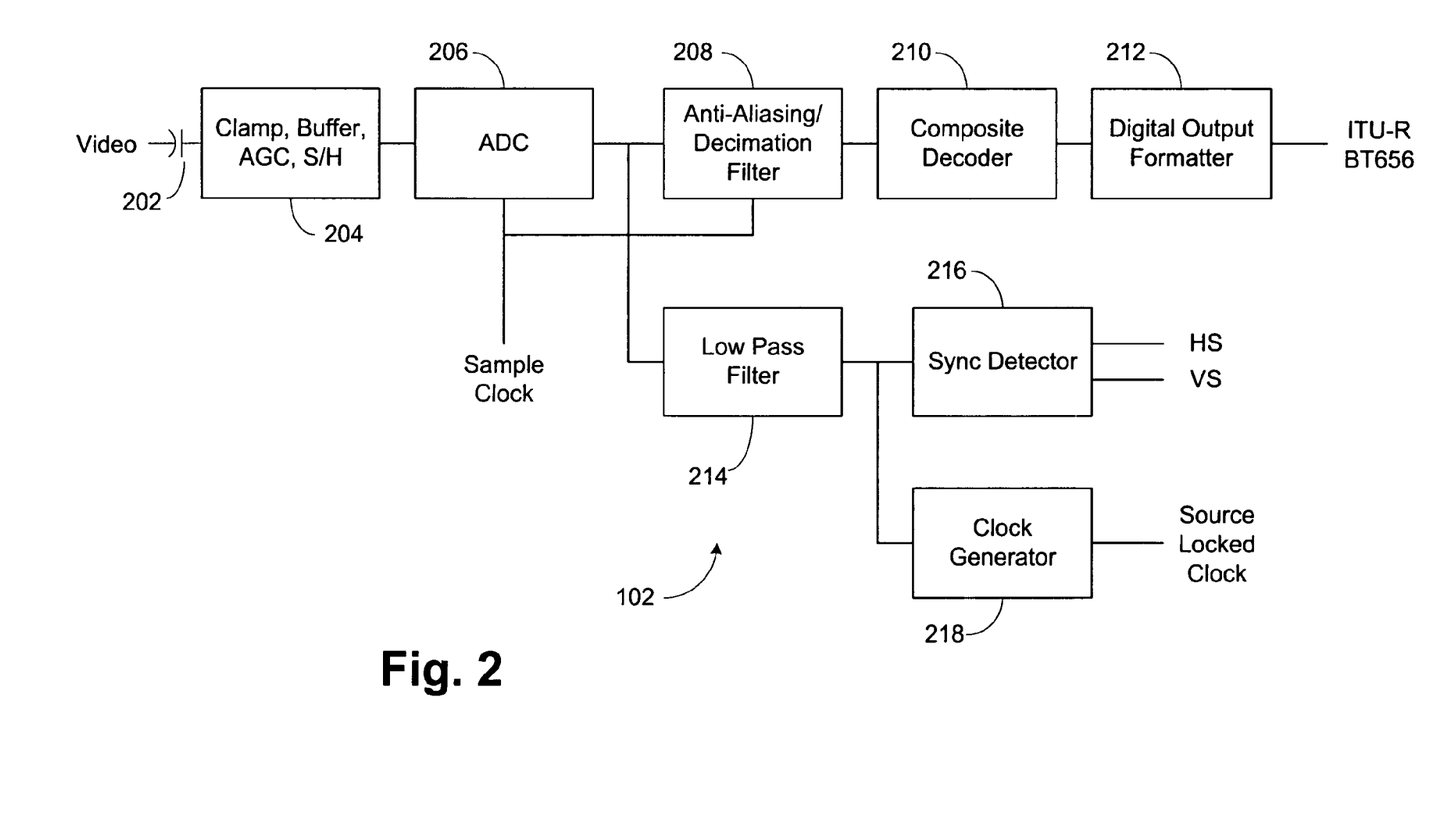
FIG. 2 is a block diagram of an analog video decoder according to the present invention.

A block diagram of an exemplary analog video decoder is shown in FIG. 2. The video signal is provided to an external capacitor 202, and is then provided to a clamp, buffer, automatic gain control (AGC) and sample and hold (S/H) block 204. This block 204 provides clamping of the video signal to ensure it does not exceed limits, impedance buffering and line driving, and automatic gain control and sample and hold. The output of block 204 is then utilized by an analog-to-digital converter (ADC) 206 which does the actual analog-to-digital conversion of the video rate signals. The ADC 206 is preferably operated on a sample clock, which is a free running sample clock and is not locked to the source video in the preferred embodiment. It is understood that in alternate embodiments, a source locked clock signal could be used. The output of the ADC 206 is provided to an anti-aliasing/decimation filter 208 because preferably the ADC 206 oversamples the video signal for increased accuracy. The anti-aliasing portion is a low pass filter used to remove sampling alias effects. The decimation portion then reduces the effective sample rate down to the desired rate, such as 27 MHz. The output of the anti-aliasing/decimation filter 208 is provided to a composite decoder 210 in the case of a composite video signal such as NTSC, PAL or SECAM. The composite decoder 210 separates the luma and chroma signals and provides those to a digital output formatter 212, which produces a 4:2:2, eight or ten bit signal according to the ITU-R BT 656 standard.

The output of the analog-to-digital converter 206 is also provided to a low pass filter 214 which removes any of the video content, leaving the sync signals. The output of the filter 214 is then provided to a sync detector 216, having outputs that are horizontal and vertical sync signals. The output of low pass filter 214 is also connected to a clock generator 218, which is effectively a PLL and produces a source locked clock used by other devices, if appropriate.

Various details of select parts will now be provided.

Figure 3:
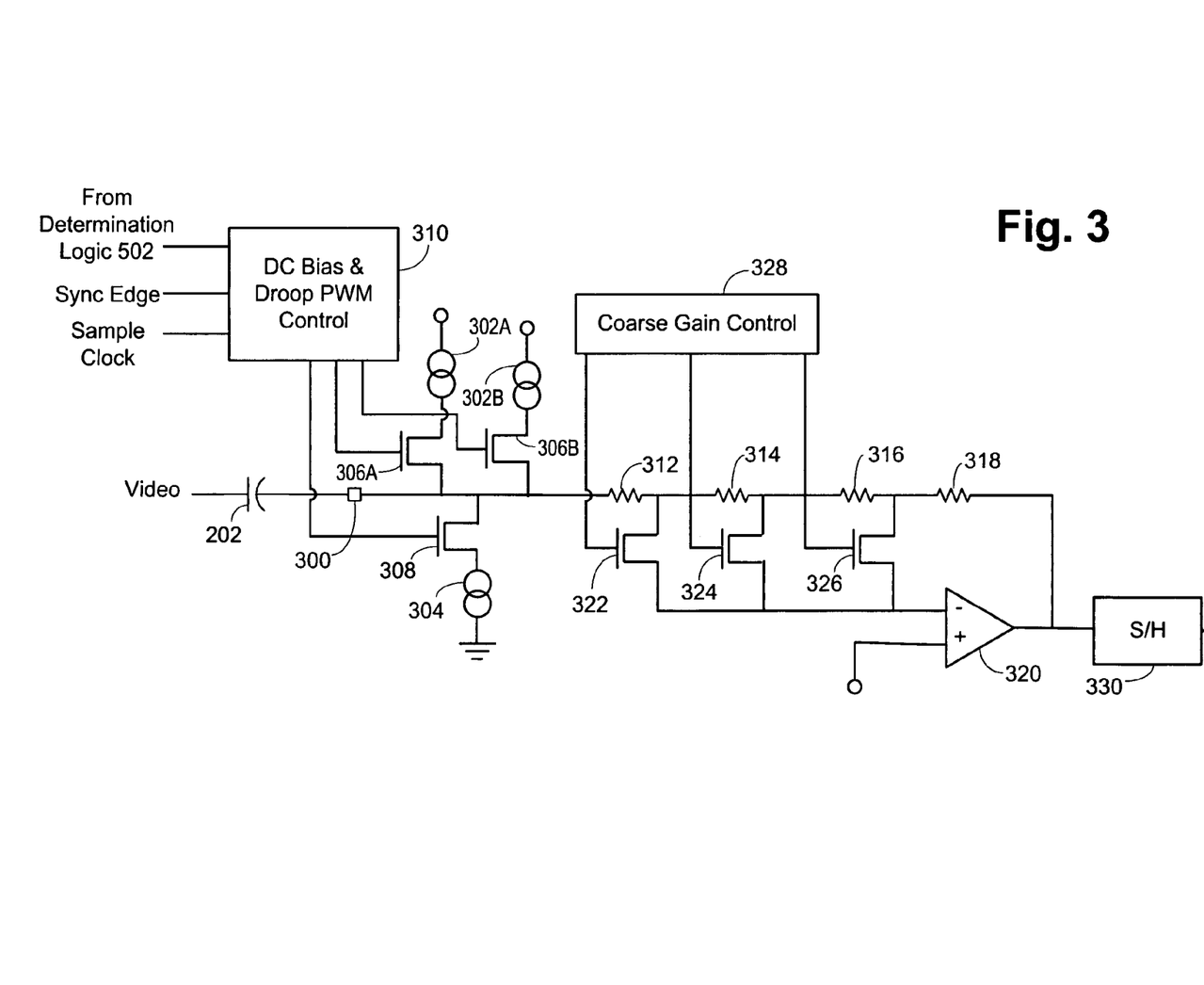
FIG. 3 is a schematic diagram of portions of the clamp, buffer, AGC and S/H block of FIG. 2 according to the present invention.

FIG. 3 provides additional details for portions of block 204. A series of current sources 302A, 302B and 304 are connected to a video input pin 300, which also receives output of the capacitor 202, through switches 306A, 306B and 308. Current sources 302A and 302B provide current to provide a positive DC charge in the signal while current source 304 provides a negative DC charge in the signal. Current sources 302A and 304 are preferably larger sources and are used to provide the proper DC bias to the signal. They are used to set the sync tip voltage at the proper level. Current source 302B is a smaller source to provide video signal droop correction, as will be explained below.

Figure 5:
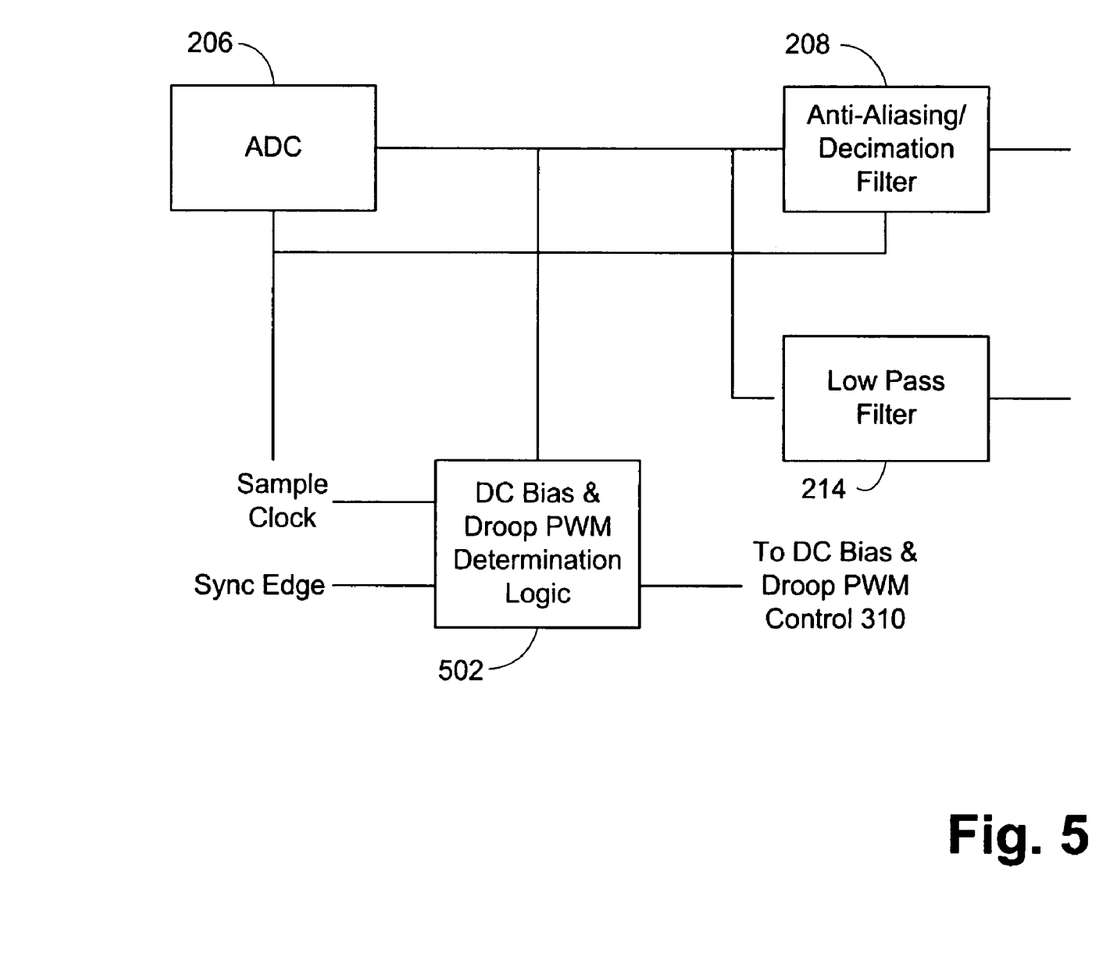
FIG. 5 is a block diagram of portions of FIG. 2 and further including DC bias and droop PWM determination logic according to the present invention.

The switches 306A, 306B and 308 are controlled by a DC bias and droop PWM control block 310. The block 310 receives a sync edge signal to indicate the falling edge of the sync signal to form a reference location; the sample clock, which is preferably 27 MHz or 54 MHz; and control signals from DC bias and droop PWM determination logic 502 (FIG. 5).

A resistor 312 has one end connected to the input 300 and the other end connected to one end of a resistor 314. The second end of resistor 314 is connected to one end of resistor 316. The second end of resistor 316 is connected to one end of resistor 318. The second end of resistor 318 is connected to the output of an op amp 320. A switch 322 is connected between the junction of resistors 312 and 314 and the inverting input of the op amp 320. A switch 324 is connected between the junction of resistors 314 and 316 and the inverting input of the op amp 320. A switch 326 is connected between the junction of resistors 316 and 318 and the inverting input of op amp 320. The non-inverting input of the op amp 320 is connected to a desired voltage. In this embodiment the resistor 312 is the primary leakage current source and is exemplary of the various other leakage current sources that are present. A coarse gain control block 328 is connected to and controls the switches 322, 324, and 326. The coarse gain control block 328 controls the switches 322, 324 and 326 to vary the feedback resistance, and thus the gain, of the op amp 320. This control is necessary to provide a first level of automatic gain control to adjust for widely varying input signal levels. The output of the op amp 320 is connected to a sample and hold block 330.

Figure 3A:
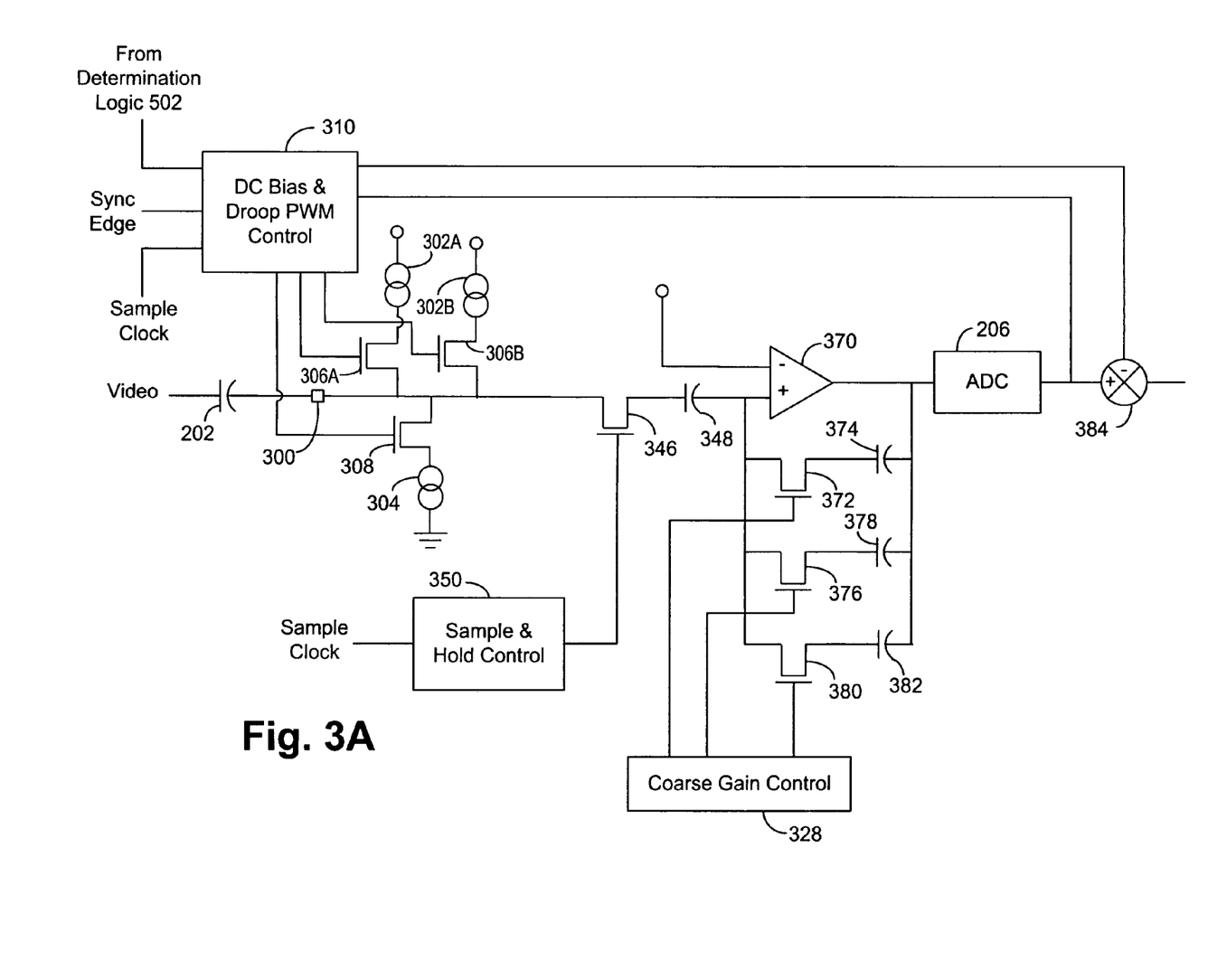
FIG. 3A is a schematic diagram of an alternative embodiment of FIG. 3.

FIG. 3A illustrates an embodiment in which the gain and sample and hold functions have been combined into a single op amp and switched capacitor feedback is used for gain control as opposed to switched resistor feedback. In this embodiment the resistor 312 is not present, but it is understood that various other leakage current sources are present to leak current to the capacitor 202.

In this embodiment, the inverting input of an op amp 370 receives a bias voltage while a switch 346 has one side connected to the input pin 300. The other side of switch 346 is connected to one side of a capacitor 348, the second side of which is connected to the non-inverting input of the op amp 370, which has an output that is connected to the ADC 206.

To perform gain control, a set of three series switches and capacitors, respectively 372 and 374, 376 and 378, and 380 and 382, are connected between the non-inverting input of op amp 370 and the output of op amp 370. The coarse gain control circuit 328 controls the switches 372, 376 and 380 to provide the desired gain.

FIG. 3A also shows an additional connection for the DC bias block 310. The output of the ADC 206 is provided to a summing junction 384 and to DC bias block 310. The DC bias block 310 analyzes the output of the ADC 206 and determines if any residual DC bias is present in the output. This operation is preferably performed by monitoring the measured voltage values of the sync tip portion of the composite video signal. These values are averaged over a number of video lines to develop an average sync tip level value. This average sync tip level value is compared to the defined sync tip level. If a residual DC bias value is present, the DC bias block 310 provides a signal representing the residual DC bias to a subtracting input of the summing junction 384. The corrected output from the summing junction 384 is provided to the anti-aliasing/decimation filter 208 and the low pass filter 214.

Figure 4A:
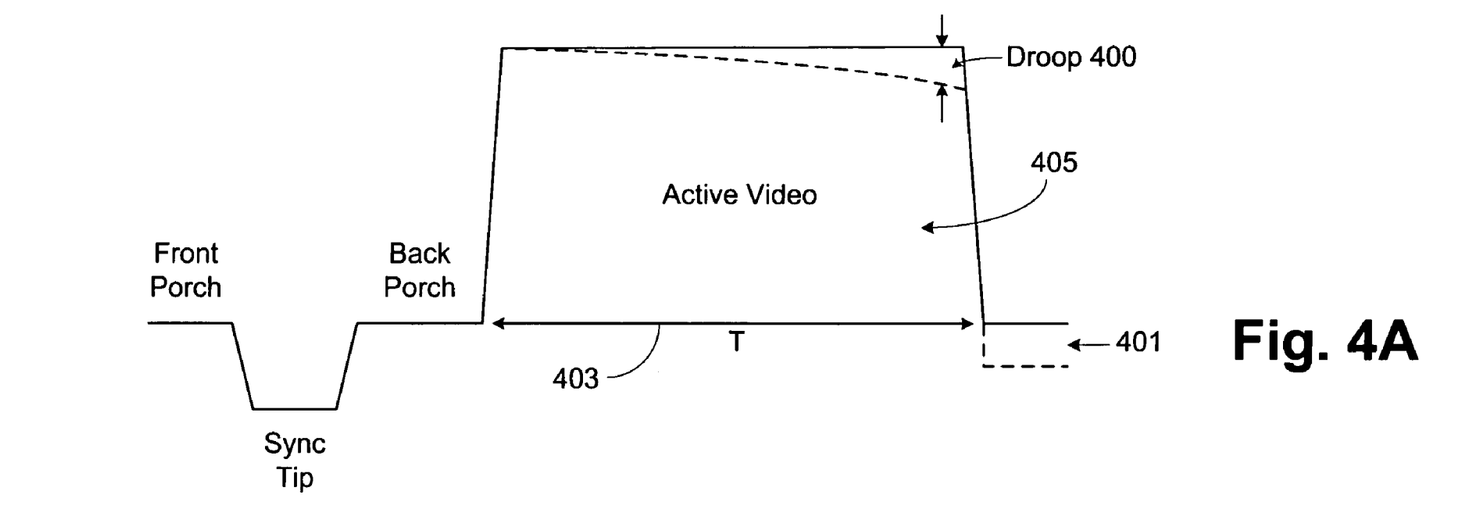
FIG. 4A is a diagram of a composite video signal illustrating signal droop.

FIG. 4A illustrates the video droop problem. Because of leakage currents from the resistor 312 to the capacitor 202, the DC level of the video signal drops during the active video portion of each video line as shown by the dashed line on FIG. 4A. The droop 400 is the amount the signal drops from the ideal level. The droop 400 can be computed using several equations and assumptions. Alpha is the area 405 of the active video region, while beta is the difference 401 between the measured front porch and an ideal front porch or the front porch and the back porch. The time T 403 is the length of the active video region. V is the voltage level of the active signal region.

Alpha=$(TV/2)+[1+\exp(-T/\text{tau})]$

Beta=$-V[1-\exp(-T/\text{tau})]$

Then, using alpha and beta and assuming exp(T/tau)=1+T/tau for T/tau for T/tau <<1

Tau=$(T/2-\text{alpha/beta})$

Thus the time constant tau of the droop 400 can be determined, given known alpha and beta (area 405 and difference 401) values.

If a known constant video signal is provided (by circuitry not shown), the average content of the signal within the active video region can be accumulated to determine alpha. Beta is determined by measuring the front porch and back porch difference under these conditions. The time T is known, so the tau or time constant value can be determined.

When one considers that the droop curve suggests that the signal is effectively being passed through a high pass transfer function:

$H(s)=s/(s+\text{tau}^{-1})$

The droop can be corrected digitally in the later digital processing stages, such as the filter 208. The digital processing simply multiplies the measured signal by the inverse of the high pass filter, though nonlinear deviations may also need to be corrected.

In the alternative to performing the above measurements and calculations, a close approximation can be developed by utilizing the above equations and developing a lookup table based on the front and back porch difference or beta and the difference between the sync tip and back porch levels, to establish a reference voltage. The lookup table entries are parameters for controlling the small current source 306B to provide correction, as described in more detail below.

Figure 4B:
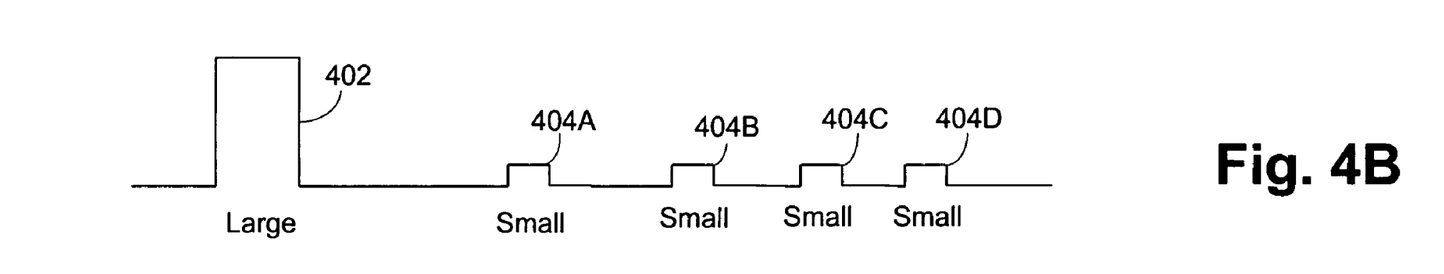
FIG. 4B is a timing diagram of a pulse stream used with the circuitry of FIG. 3 to correct DC bias and signal droop.

FIG. 4B illustrates the timing of the operation of the current sources 302A, 302B, 304A and 304B. Based on the voltage level of the sync tip, one of the large current sources 302A or 304A is turned on during the sync tip to properly set the basic DC level for the video signal. The width of the large pulse 402 is varied based on the input DC voltage level of sync tip and the needed amount of bias.

FIG. 4B illustrates the timing of the operation of the current sources 302A, 302B, 304A and 304B. The determination of the amount of basic DC bias needed to properly set the DC level of the video signal operation as described above with respect to the correction of the residual DC bias is performed to determine the needed basic DC bias. Based on the needed basic DC bias, one of the large current sources 302A or 304A is turned on during the sync tip to properly set the basic DC level for the video signal. The width of the large pulse 402 is varied, preferably pulse width modulated, based on the input DC voltage level of the sync tip and the needed amount of basic DC bias. In the preferred embodiment, a plurality of different timings and durations are provided, each applicable to a portion of the basic DC bias amount. Even though a particular setting may not be optimal for correcting every bias within its portion, it is sufficiently close to meet the desired goal, with any necessary fine tuning being done in the residual DC bias correction operation.

Droop correction can be done using the lookup table described above. By measuring the difference between sync tip and the blank period of the back porch, the portion of the signal following a sync pulse, a reference level is determined as one index into the lookup table. A measurement is then taken of the level of the front porch, the portion of the signal preceding a sync pulse. The difference between this level and the back porch level is the second index into the lookup table. Understanding that the droop is an exponential function, a PWM control function can be applied to the switch 306B to have the small current source 306B offset the droop. Thus, a series of pulses 404A, 404B, 404C and 404D are applied to the switch 306B to offset the droop. The exact timing and duration of each pulse is determined based on the use of values in the above equations and the current provided by the small current source 308B, and those resulting values are the lookup table entries. In the preferred embodiment, a plurality of different timings and durations are provided, each applicable to a portion of the correctable droop amount. Even though a particular setting may not be optimal for correcting every droop within its portion, it is sufficiently close to meet the desired goal.

FIG. 5 illustrates that the DC bias and droop PWM determination logic 502 receives the output of the ADC 206. It also receives the sync edge signal and the sample clock. The logic 502 determines the PWM values of the large and small current sources 306A, 308 and 306B. Preferably, the logic 502 methodically performs the basic DC bias level and droop measurement over a large number of video lines and averages the results. It is understood no bias or droop control is used during the measurement period. This average result then determines the PWM operation until after the next sampling operation, which preferably occurs every few seconds.

While illustrated as individual current sources, the current sources 302A, 302B and 304 can each be formed by a plurality of different sized current sources, with an accompanying plurality of switches, to allow better control or range of the operations. For example, three current sources set at 1.5 mA, 0.5 mA and 0.1 mA can be used for current sources 302A and 302B and a similar three current sources set at 1.5 mA, 0.5 mA and 0.1 mA can be used for current source 304.

While illustrative embodiments of the invention have been illustrated and described, it will be appreciated that various changes can be made therein without departing from the spirit and scope of the invention.

The invention claimed is:

1. A system for providing DC bias in a composite video signal comprising:
   a video signal input for receiving a composite video signal from a capacitor;
   a DC bias current source;
   a DC bias determination circuit to determine the necessary DC bias of the received composite video signal;
   a DC bias switch connected between said DC bias current source and said video signal input; and
   a DC bias activation circuit coupled to said DC bias determination circuit and connected to said DC bias switch to activate said DC bias switch for a period sufficient to adjust the sync tip portion of the received composite video signal to a desired level, said DC bias activation circuit pulse width modulating said DC bias switch responsive to a DC bias value.

2. The system of claim 1, wherein said DC bias determination circuit measures the voltage of the sync tip portion of the received composite video signal to determine the necessary DC bias.

3. The system of claim 2, wherein said DC bias determination circuit performs a plurality of measurements and averages the results to provide the DC bias value.

4. The system of claim 3, wherein said DC bias activation circuit pulse width modulates said DC bias switch according to a plurality of pulse width modulation settings, each responsive to a portion of a potential range of DC bias values.

5. The system of claim 1, wherein said DC bias activation circuit pulse width modulates said DC bias switch according to a plurality of pulse width modulation settings, each responsive to a portion of a potential range of DC bias values.

6. The system of claim 1, wherein said DC bias current source is formed by a plurality of individual current sources and said DC bias switch is formed by a plurality of individual switches, with each of the individual switches respectively for each of the individual current sources.

7. An analog video decoder comprising:
 a DC bias providing system for providing DC bias in a composite video signal including:
  a video signal input for receiving a composite video signal from a capacitor;
  a DC bias current source;
  a DC bias determination circuit to determine the necessary DC bias of the received composite video signal;
  a DC bias switch connected between said DC bias current source and said video signal input; and
  a DC bias activation circuit coupled to said DC bias determination circuit and connected to said DC bias switch to activate said DC bias switch for a period sufficient to adjust the sync tip portion of the received composite video signal to a desired level;
 a gain control circuit having a gain control circuit input coupled to said DC bias providing system to receive the DC bias adjusted received composite video signal and providing a gain control circuit output;
 a sample and hold circuit having a sample and hold circuit input coupled to said gain control circuit output and providing a sample and hold circuit output;
 an analog to digital converter having an analog to digital converter input coupled to said sample and hold circuit output and providing an analog to digital converter output;
 a composite decoder having a composite decoder input coupled to said analog to digital converter output and providing a composite decoder output;
 a digital formatter having a digital formatter input coupled to said composite decoder output and providing a digital video signal output;
 a sync detector circuit having a sync detector input coupled to said analog to digital converter output and providing horizontal and vertical sync outputs; and
 a clock generator having a clock generator input coupled to said low pass filter output and providing a source locked clock output.

8. The decoder of claim 7, wherein said DC bias determination circuit measures the voltage of the sync tip portion of the received composite video signal to determine the necessary DC bias.

9. The decoder of claim 8, wherein said DC bias determination circuit performs a plurality of measurements and averages the results to provide a DC bias value.

10. The decoder of claim 9, wherein said DC bias activation circuit pulse width modulates said DC bias switch responsive to said DC bias value.

11. The decoder of claim 10, wherein said DC bias activation circuit pulse width modulates said DC bias switch according to a plurality of pulse width modulation settings, each responsive to a portion of a potential range of DC bias values.

12. The decoder of claim 7, wherein said DC bias activation circuit pulse width modulates said DC bias switch responsive to a DC bias value.

13. The decoder of claim 12, wherein said DC bias activation circuit pulse width modulates said DC bias switch according to a plurality of pulse width modulation settings, each responsive to a portion of a potential range of DC bias values.

14. The decoder of claim 7, wherein said DC bias current source is formed by a plurality of individual current sources and said DC bias switch is formed by a plurality of individual switches, with each of the individual switches, respectively, for each of the individual current sources.

15. A method for providing DC bias in a composite video signal comprising:
 receiving a composite video signal from a capacitor and providing a leakage current to the capacitor;
 determining the DC bias of the received composite video signal; and
 switchably connecting a DC bias current source to the received composite video signal for a period sufficient to provide DC bias to the received composite video signal, wherein the DC bias current source switching is pulse width modulated responsive to a DC bias value.

16. The method of claim 15, wherein determining the DC bias in the received composite video signal includes measuring the voltage of the sync tip portion of the received composite video signal to determine the DC bias.

17. The method of claim 16, wherein said measurement is performed a plurality of times and the results are averaged to provide the DC bias value.

18. The method of claim 17, wherein said pulse width modulation of said DC bias current source switching is done according to one of a plurality of pulse width modulation settings, each responsive to a portion of a potential range of DC bias values.

19. The method of claim 15, wherein said pulse width modulation of said DC bias current source switching is done according to one of a plurality of pulse width modulation settings, each responsive to a portion of a potential range of DC bias values.

* * * * *